US010627356B2

(12) United States Patent
Abadi et al.

(10) Patent No.: US 10,627,356 B2
(45) Date of Patent: Apr. 21, 2020

(54) APPARATUS FOR DETERMINING COMBUSTIVE BEHAVIOR

(71) Applicants: Mohammad Shams Esfand Abadi, Tehran (IR); Hamid Reza Azemati, Tehran (IR); Mohammad Sadegh Taher Tolou Del, Tehran (IR); Hamid R. Taghiyari, Tehran (IR)

(72) Inventors: Mohammad Shams Esfand Abadi, Tehran (IR); Hamid Reza Azemati, Tehran (IR); Mohammad Sadegh Taher Tolou Del, Tehran (IR); Hamid R. Taghiyari, Tehran (IR)

(*) Notice: Subject to any disclaimer, the term of this patent is extended or adjusted under 35 U.S.C. 154(b) by 347 days.

(21) Appl. No.: 15/866,752

(22) Filed: Jan. 10, 2018

(65) Prior Publication Data

US 2019/0212283 A1    Jul. 11, 2019

(51) Int. Cl.
*G01N 25/00* (2006.01)
*G01K 1/00* (2006.01)
*G01N 25/50* (2006.01)

(52) U.S. Cl.
CPC .................. *G01N 25/50* (2013.01)

(58) Field of Classification Search
USPC ...................... 374/8, 141, 208, 120
See application file for complete search history.

(56) References Cited

U.S. PATENT DOCUMENTS

| 7,329,043 B2* | 2/2008 | Ogle | G01N 25/18 374/112 |
| 2009/0168833 A1* | 7/2009 | Sarabi | G01N 25/50 374/8 |
| 2011/0228808 A1* | 9/2011 | Ayotte | G01N 25/50 374/8 |
| 2013/0235898 A1* | 9/2013 | Maruta | G01N 25/52 374/8 |

* cited by examiner

*Primary Examiner* — Mirellys Jagan (57) ABSTRACT

Disclosed is an apparatus for determining the combustive behavior of a specimen. The apparatus comprises a housing, a burner disposed within the housing, a specimen holder for holding a specimen disposed within the housing such that, the specimen is exposed to the flame for a predetermined time. During and upon the completion of the predetermined time, the apparatus is configured to determine the combustive properties of the specimen including the ignition time, glowing time, fire endurance time, length, width and area of the burnt surface, mass loss rate incurred by the specimen from the combustion and amount of heat and smoke released from the combustion.

20 Claims, 6 Drawing Sheets

APPARATUS FOR DETERMINING COMBUSTIVE BEHAVIOR

BACKGROUND OF THE INVENTION

During late 1970s and early 1980s, the importance of a reliable bench-scale engineering tool for measuring heat release rate was being realized. A number of such devices had already been built. None was felt to be appropriate for normal engineering laboratory use. The problems were two-fold: errors in measurement and difficulty of operation. Insulated box (sensible enthalpy) types of designs were demonstrated to show large systematic errors. Instruments built on other measurement principles, such as substitution burner, were capable of good accuracy but were very complex and difficult to install and maintain. This indicated that an instrument of a new design was needed.

Several years of exploratory research on various instrument designs were conducted. The successful design was termed the Cone calorimeter and was first described in an NBS report in 1982. Depending on the specific application, tests can determine combustion characteristics such as ignition times, mass loss, heat and smoke release rates, heat of combustion and the average specific extinction area. The Cone calorimeter test is at present the most advanced method for assessing materials reaction to fire. The method follows the procedure given in international standard ISO 5660-1:1993(E).

Test apparatuses approved by ASTM International, Inc. for measuring the combustive properties and behavior of materials or objects, such as the Cone calorimeter and the Fire Propagation Apparatus, irradiate a specimen of a material or an object with a known infrared (IR) heat flux from a radiant heating source. The specimen is typically coated with paint or a carbon mixture to improve absorption of the radiant heat flux in order to simulate heat absorption during an actual fire, when the material or object becomes covered with soot and thereby absorbs most of the radiant energy incident upon it. The incident heat flux from the radiant heater is often taken as a measure of the heat flux required to cause the detectable condition or response, such as ignition, of the material or object. However, because of the coating, not all of the heat flux incident on the coating is absorbed by the specimen and the portion of the heat flux emanating from radiant heating source that is absorbed by the specimen varies from one coating to another. As a result, there is a problem evaluating and comparing test data from specimens having different coatings.

However, prior to the present invention, there was no standard apparatus for electronically measuring the width, length, and area of the burnt surface, the duration of flame after the removal of the piloted flame (fire endurance), back-darkening, back-holing, and back-firing times. For the purpose of determining the combustive behavior of a material, the duration of flame after the removal of the direct flame exposure would be necessary. Proper fire safety measures depend upon limitation of fire spread and growth, so it will be necessary to obtain a device that accurately measures fire spread patterns with high precision.

Furthermore, it is essential to measure the time it takes for the fire to penetrate from the front surface of the material, where it was exposed to, to the back surface (the opposite side of the specimen where the direct flame-exposure is carried out). Also, the direction of flame affects the burning behavior of materials; it will therefore be vital to have a device that can do the flame-exposure testing in different directions and analyze the effects for each.

In the meantime, not all researches can be carried out with great expenses of providing large specimens as it is required in Steiner Tunnel, ULI 723, and full-scale furnaces (ASTM E-119; NFPA 251 & 2; ISO 834); so, it would also be helpful to provide apparatus and method that work with small-size specimens. Also, the coating of specimens with paint or carbon mixture may affect the final results and analysis; it should therefore be necessary to provide methods and devices that do not need the specimens to be coated before the testing procedures.

Therefore, it would be advantageous to provide an apparatus for overcoming the above shortcomings of the prior art.

SUMMARY OF THE INVENTION

An embodiment of the present invention is directed to an apparatus for determining the combustive behavior of various specimens pertaining to various respective materials. Said combustive behavior of a specimen is determined by a plurality of factors (or properties), which in turn are determined by the apparatus, which employs several electronic measurement devices and image analyzers to that end. Said factors include: ignition time, glowing time, back-darkening time, back-holing time, back-firing time, fire endurance, length, width and area of the burnt surface, quantity of mass loss and heat and smoke release rates. The materials pertaining to the specimens include different species of solid wood, wood-composite materials, different kinds of papers, cardboards, fiberboards, particleboards and wood-plastic composites. The specimens could be treated (or impregnated) with at least of one or more preservatives, one or more fire-retardants and one or more nanomaterials. The apparatus is adapted to be employed within a scientific field and as well as within an industry environment.

The apparatus comprises a housing, a specimen holder disposed within the housing wherein, the specimen holder is adapted to hold the specimen. The specimen comprises a flat rectangular member wherein, the specimen holder is adapted to hold the specimen uprightly. The specimen holder is adapted to be moved back and forth within the housing.

The apparatus further comprises a burner holder for holding a Bunsen-type burner there within. More particularly, the burner is held within the burner holder such that, the flame emanating from the burner emanates at an angle of 45° with respect to horizontal whereby, the flame is incident upon the specimen at an angle of 45° as the specimen is moved towards the flame beyond its tip. Pilot ignition method is employed within the apparatus, which enables the length and width (or diameter) of the flame to be adjustable. The fuel for the burner is supplied at an adjustable flow rate.

The aforementioned electronic measurement devices and image analyzers, for ease of understanding, are divided into several functional modules. Each module is designated to perform a function, the result of which is reflective of a combustive behavior of the specimen. In order to determine the combustive behavior of the specimen, the specimen is exposed to the flame for a predetermined flame-exposure time. Upon the completion of the flame-exposure time, the specimen holder is moved away from the burner to prevent over exposure.

The apparatus further comprises an ignition module for recording the amount of time (referred to as ignition time) required for the onset of ignition visibly evident on the specimen at the point of incidence of the flame upon the specimen. The apparatus further comprises a glowing module for recording the amount of time taken (referred to as glowing time) for the onset of glowing at the point of incidence. The apparatus further comprises a fire endurance module for recording the amount of time (referred to as fire endurance time) required for the fire from the flame to hold onto the specimen upon the completion of the flame-exposure time.

One aspect of the present disclosure is directed to an apparatus for determining the combustive behavior of a specimen, the apparatus comprising: (a) a housing; (b) a burner holder disposed within the housing, the burner holder for holding a burner wherefrom flame is generated; (c) a specimen holder disposed within the housing, the specimen holder for holding a specimen, the distance between the specimen holder and the burner holder being adjustable, the specimen configured to be exposed to the flame for a predetermined flame-exposure time; (d) an ignition module for recording the amount of time taken for the onset of ignition visibly evident on the specimen at the point of incidence of the flame upon the specimen; (e) a glowing module for recording the amount of time taken for the onset of glowing at the point of incidence; and (i) a fire-endurance module for recording the amount of time taken for the fire to hold upon the completion of the flame-exposure time.

In one embodiment, a module comprises an image analyzer. In another embodiment, the burner comprises a Bunsen-type burner. In one embodiment, the specimen comprises one of a solid wood, wood-composite material, paper, cardboard, fiberboard, particleboards and a wood-plastic composite. In another embodiment, the specimen is treated or impregnated with at least one of one or more preservatives, one or more fire retardants, and one or more nanomaterials. In one embodiment, the specimen comprises a flat rectangular member. In a related embodiment, the rectangular sheet is held upright by the specimen holder and the flame from the burner is obliquely incident upon the specimen. In another related embodiment, the rectangular sheet is held obliquely by the specimen holder and the angle of the incidence of the flame upon the specimen is oblique; the flame disposed underneath the oblique specimen.

In one embodiment, the length and the width (or diameter) of the flame emanating from the burner is adjustable. In another embodiment, the flow-rate of the fuel fueling the flame is adjustable. In one embodiment, the calorie of the fuel is adjustable. In another embodiment, the flow rate of oxygen supplied into the housing is adjustable.

In one embodiment, the apparatus further comprises (a) a width module for, upon the completion of the flame-exposure time, measuring the width of the combusted surface on the specimen; (b) a length module for, upon the completion of the flame-exposure time, measuring the length of the combusted surface on the specimen; and (c) an area module for, upon the completion of the flame-exposure time, determining the area of the combusted surface on the specimen. In a related embodiment, the module comprises an image analyzer.

In another embodiment, the apparatus further comprises a mass loss module for, upon the completion of the flame-exposure time, determining the mass loss, the specimen has incurred from the combustion. In one embodiment, the apparatus further comprises (a) a heat module for determining the amount of heat released from the combustion of the specimen; and (b) a smoke module for determining the amount of smoke released from the combustion of the specimen.

In one embodiment of the apparatus, the housing comprises: a base; a pair of opposingly-disposed parallel sidewalls extending upwardly from the base; a rear wall extending upwardly from the base, the rear wall being perpendicular to the sidewalls, the height of the rear wall being same as that of a sidewall; a front wall extending upwardly from the base and being parallel to the rear wall, the height of the front wall being lesser than that of the rear wall; and an open top; and rear and sidewalls for preventing the intervention of air with the flame while the shorter height of the front wall and open top enable user-access into the housing.

Another aspect of the present disclosure is directed to an apparatus for determining the combustive behavior of a specimen, the apparatus comprising: (a) a housing; (b) a burner holder disposed within the housing, the burner holder for holding a burner wherefrom flame is generated; (c) a specimen holder disposed within the housing, the specimen holder for holding a specimen, the distance between the specimen holder and the burner holder being adjustable, the specimen configured to be exposed to the flame for a predetermined flame-exposure time; (d) an ignition module for recording the amount of time taken for the specimen to catch visible fire at the point of incidence of the flame upon the specimen; (e) a glow module for recording the amount of time taken for the point of incidence to glow; (f) a back-darkening module for recording the amount of time taken for the back of the specimen opposite to the point of incidence to darken; (g) a back-holing module for recording the amount of time taken for back of the specimen to incur fracture or split owing to the flame exposure; (h) a back-firing module for recording the amount of time taken for back of the specimen to catch visible fire; (i) a fire-endurance module for recording the amount of time taken for the fire to hold upon disengagement between flame and the specimen; (j) a width module for, upon the completion of the flame-exposure time, measuring the width of the combusted surface on the specimen; (k) a length module for, upon the completion of the flame-exposure time, measuring the length of the combusted surface on the specimen; (l) an area module for, upon the completion of the flame-exposure time, determining the area of the combusted surface on the specimen; (m) a mass loss module for, upon the completion of the flame-exposure time, determining the mass loss, the specimen has incurred from the combustion; (n) a heat module for determining the amount of heat released from the combustion of the specimen; and (o) a smoke module for determining the amount of smoke released from the combustion of the specimen.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION

A description of embodiments of the present invention will now be given with reference to the figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention disclosed herein generally relates to fire safety engineering and more particularly to an apparatus for determining the combustive behavior of various specimens pertaining to various respective materials.

Embodiments of the present invention are directed to an apparatus for determining the combustive behavior of various specimens pertaining to various materials. Said combustive behavior of a specimen is determined by a plurality of factors (or properties) determined by the apparatus, which employs several electronic measurement devices and image analyzers to that end. Said factors include: ignition time, glowing time, back-darkening time, back-holing time, back-firing time, fire endurance, length, width and area of the burnt surface, quantity of mass loss and heat and smoke release rates wherein, each of the factors will become apparent from the following body of text.

The materials pertaining to the specimens include different species of solid wood, wood-composite materials, different kinds of papers, cardboards, fiberboards, particleboards and wood-plastic composites. The specimens could be treated (or impregnated) with at least of one or more preservatives, one or more fire-retardants and one or more nanomaterials. The apparatus is adapted to be employed within a scientific field and as well as within an industry environment.

Referring to FIGS. 1 through 4, a preferred embodiment of the apparatus 10 comprises a housing 12 comprising horizontal, rectangular base about which the apparatus 10 rests on the ground, a pair of opposingly-disposed parallel sidewalls extending upwardly from the side edges of the base, a rear wall extending upwardly from the rear edge of the base. The rear edge is disposed between the pair of sidewalls and is perpendicular each sidewall.

Figure 1:
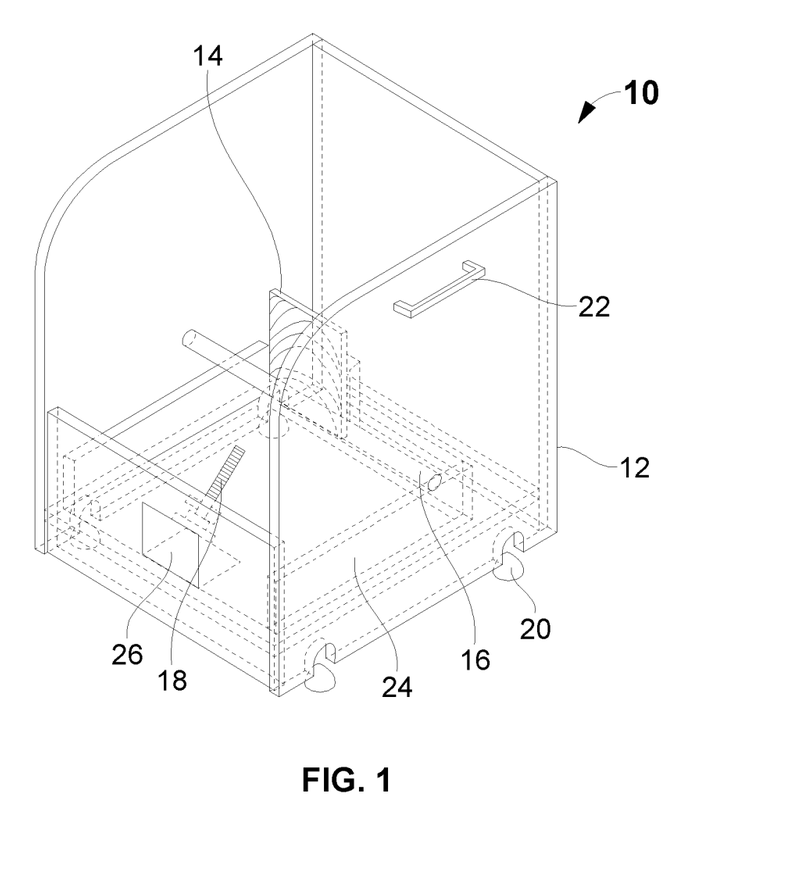
FIG. 1, according to an embodiment of the present invention, depict an illustration of a perspective view of the apparatus.
Figure 2:
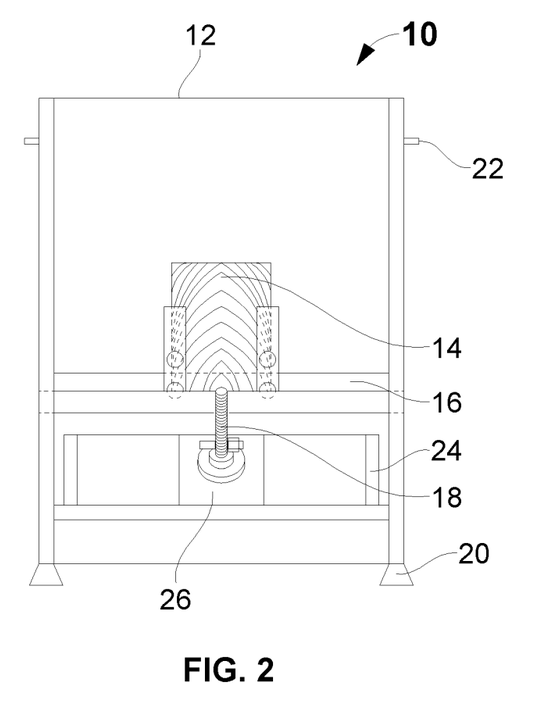
FIG. 2, according to an embodiment of the present invention, depicts an illustration of the front view of the apparatus.
Figure 3:
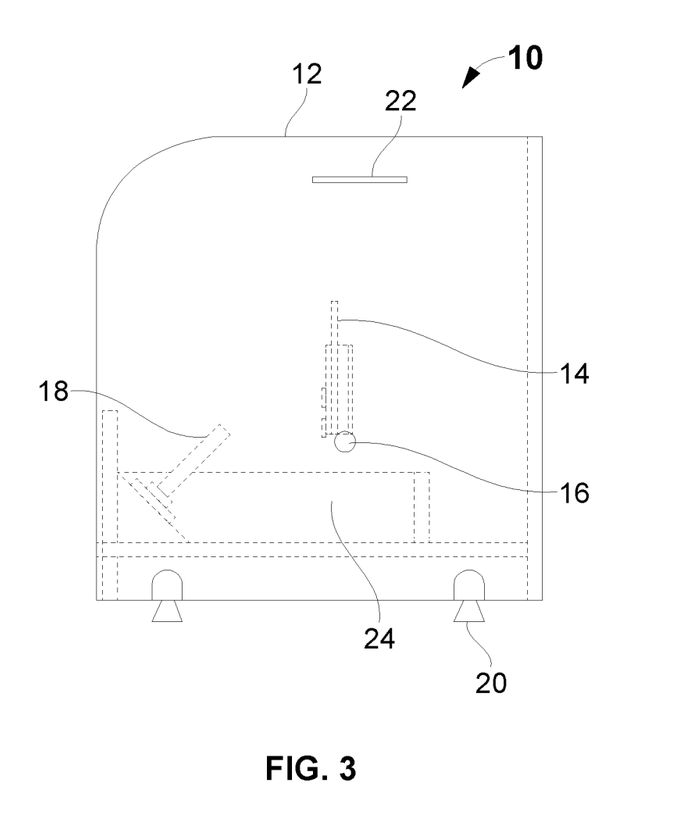
FIG. 3, according to an embodiment of the present invention, depicts an illustration of a side view of the apparatus.
Figure 4:
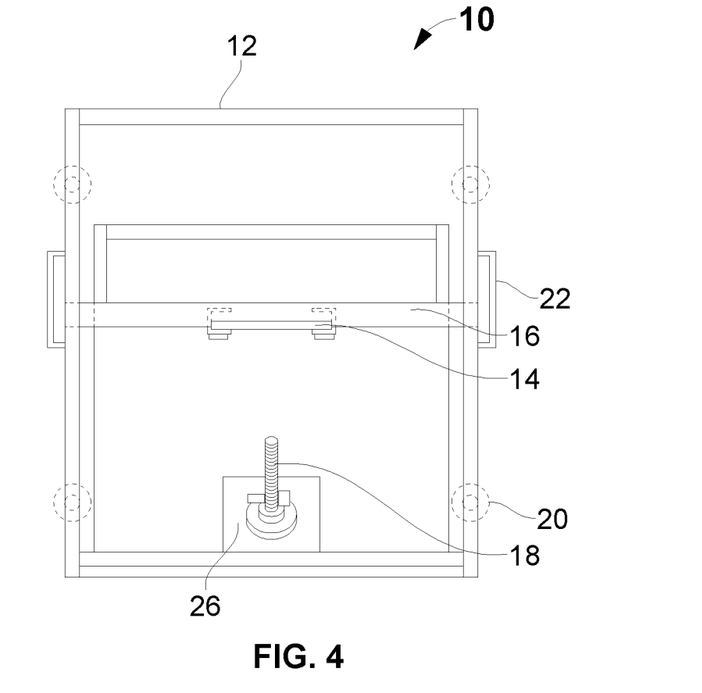
FIG. 4, according to an embodiment of the present invention, depicts an illustration of the top view of the apparatus.

As can be appreciated from FIGS. 1 through 3, the rear walls and the sidewalls share equal height. The housing 12 further comprises a front wall extending upwardly from the front edge of the base. Notably, the height of the front is significantly lesser than that of the opposingly-disposed rear wall. The housing 12 comprises an open top wherein, the open top combined with the shorter front wall allows a user access thereinto. The side and rear walls prevent any air dynamic from intervening the combustive test being carried out within the housing 12. Each sidewall is fitted with a handle 22 for enabling the apparatus 10 to be carried thereabout.

Referring to FIGS. 1 through 4, the apparatus 10 further comprises a specimen holder 16 disposed within the housing 12. The specimen 14 comprises a flat rectangular member, the length, width and thickness of which ranges between 20 to 350 mm, 20 to 250 mm and 0.2 to 50 mm respectively. The specimen holder 16 is adapted to hold the specimen 14 uprightly such that, the surfaces of the specimen 14 are parallel to the front and rear walls. More particularly, the specimen holder 16 is adapted to hold the specimen 14 at the sides thereof so as to subject most of the surface area of the specimen 14 to combustion-testing. The specimen holder 16 is engaged with a pair of tracks 24, which enable specimen holder 16, and thereby the specimen 14, to move back and forth within the housing 12.

The housing 12 may comprise of a base a pair of opposingly-disposed parallel sidewalls extending upwardly from the base and a rear wall extending upwardly from the base. The rear wall may be perpendicular to the sidewalls, the height of the rear wall being same as that of a sidewall. The housing 12 may further comprise a front wall extending upwardly from the base and being parallel to the rear wall, the height of the front wall being lesser than that of the rear wall. The housing 12 may further comprise an open top, and rear and sidewalls for preventing the intervention of air with the flame while the shorter height of the front wall and open top enable user-access into the housing 12.

Referring to FIGS. 1 through 4, the apparatus 10 further comprises a burner holder 26 for holding a Bunsen-type burner 18 therewithin. More particularly, the burner 18 is held within the burner holder 26 such that, the flame emanating from the burner 18 emanates at an angle of 45° with respect to horizontal. This causes the flame to be incident upon the specimen at an angle of 45° as the specimen 14 is moved towards the flame beyond the tip (of the flame). The burner holder 26 is adapted to be moved to and fro and sideways.

Pilot ignition method is employed within the apparatus 10, which enables the length and width (or the diameter) of the flame to be adjustable. Notably, the internal diameter of the burner nozzle is around 11 mm. Other types of burners can also be used so far as the length and diameter of the flame can be adjusted and controlled. The fuel for the burner 18 is supplied at an adjustable flow rate. However, a flow rate of 0.096±2 liters per second is preferred. Further, the fuel is selected such that, it has a specific burning energy per gram. Although many fuels can be used for the burner, natural gas comprising 90 to 98% of methane ($CH_4$) is preferred.

One aspect of the present disclosure is directed to an apparatus for determining the combustive behavior of a specimen. The apparatus may comprise a housing; a burner holder disposed within the housing, the burner holder for holding a burner wherefrom flame is generated; a specimen holder disposed within the housing, the specimen holder for holding a specimen, the distance between the specimen holder and the burner holder being adjustable, the specimen configured to be exposed to the flame for a predetermined flame-exposure time; an ignition module for recording the amount of time taken for the onset of ignition visibly evident on the specimen at the point of incidence of the flame upon the specimen; and a glowing module for recording the amount of time taken for the onset of glowing at the point of incidence; and a back-darkening module for recording the amount of time taken for the back of the specimen opposite to the point of incidence to darken.

The apparatus further comprises a fire-endurance module for recording the amount of time taken for the fire to hold upon the completion of the flame-exposure time. A module may comprise an image analyzer. Any burner type is contemplated, however, the burner may comprise a Bunsen-type burner. The specimen may comprise one of a solid wood, wood-composite material, paper, cardboard, fiberboard, particleboards and a wood-plastic composite, and/or be treated or impregnated with at least one of one or more preservatives, one or more fire retardants, and one or more nanomaterials. The specimen may be a flat rectangular member. The rectangular sheet may be held upright by the specimen holder and the flame from the burner is obliquely incident upon the specimen. The rectangular sheet may, in one example, be oblique to the specimen holder and the angle of the incidence of the flame upon the specimen is oblique.

Referring to FIGS. 1 through 6, the aforementioned electronic measurement devices and image analyzers, for ease of understanding, are divided into several functional modules. Each module is designated to perform a function, the result of which is reflective of a combustive behavior of the specimen 14. In accordance with ISO 11925-3, in order to determine the combustive behavior of the specimen 14, the specimen 14 is exposed to the flame for a predetermined time, which is referred to as flame-exposure time. The flame-exposure time comprises 120 seconds. Upon the completion of the flame-exposure time, the specimen holder 16 is moved away from the burner 18 to prevent over exposure.

The apparatus (of the preferred embodiment) further comprises an ignition module for recording the amount of time (referred to as ignition time) required for the onset of ignition upon the specimen (at the point of incidence of the flame thereon). The apparatus further comprises a glowing module for recording the amount of time taken (referred to as glowing time) for the onset of glowing upon the specimen at the point of incidence. The apparatus further comprises a fire endurance module for recording the amount of time (referred to as fire endurance time) required for the fire from the flame to hold onto the specimen upon the completion of the flame-exposure time. The modules are configured to measure the aforementioned time-based characteristics with a precision of up to a millisecond.

The apparatus (of the preferred embodiment) further comprises a width module for, upon the completion of the flame-exposure time, determining the width of the combusted surface of the specimen. The apparatus further comprises a length module for, upon the completion of the flame-exposure time, determining the length of the combusted surface of the specimen. The apparatus further comprises an area module for, upon the completion of the flame-exposure time, determining the area of the combusted surface of the specimen. The apparatus further comprises a mass loss module for, upon the completion of the flame-exposure time, determining the mass loss, the specimen has incurred from the combustion. The modules are configured to measure the aforementioned mass-based characteristics with a precision of up to a milligram. The mass loss rate of the specimen is also monitored using a load cell connected to the specimen or the holder of the specimen. The precision of the load cell can be adjusted according to the needs of science (R&D) or industry.

The apparatus (of the preferred embodiment) further comprises a heat module for determining the amount of heat released from the combustion of the specimen. The heat module comprises a temperature sensor. The apparatus further comprises a smoke module for determining the amount of smoke released from the combustion of the specimen. The smoke module comprises a smoke sensor. In one embodiment, the apparatus to be connected to a smoke detector with the specifications mentioned in "Standard Test Method for Heat and Visible Smoke Release Rates for Materials and Products using an Oxygen Consumption calorimeter (ASTM E 1354-90)".

Figure 5:
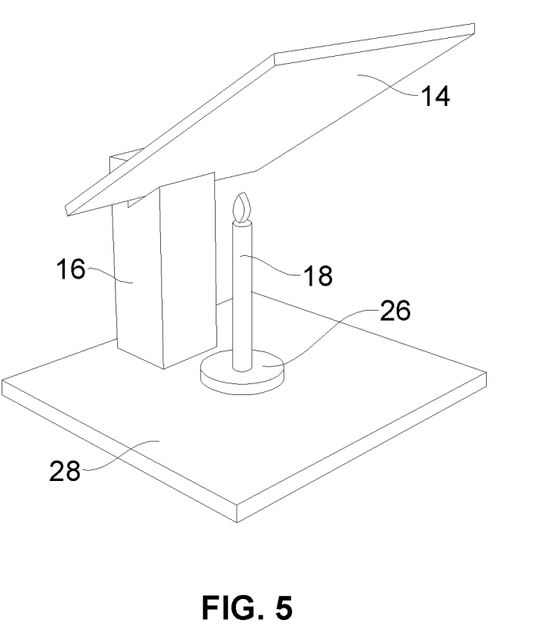
FIG. 5, according to an alternate embodiment of the present invention, depicts an illustration of a perspective views of the burner and specimen setup.
Figure 6:
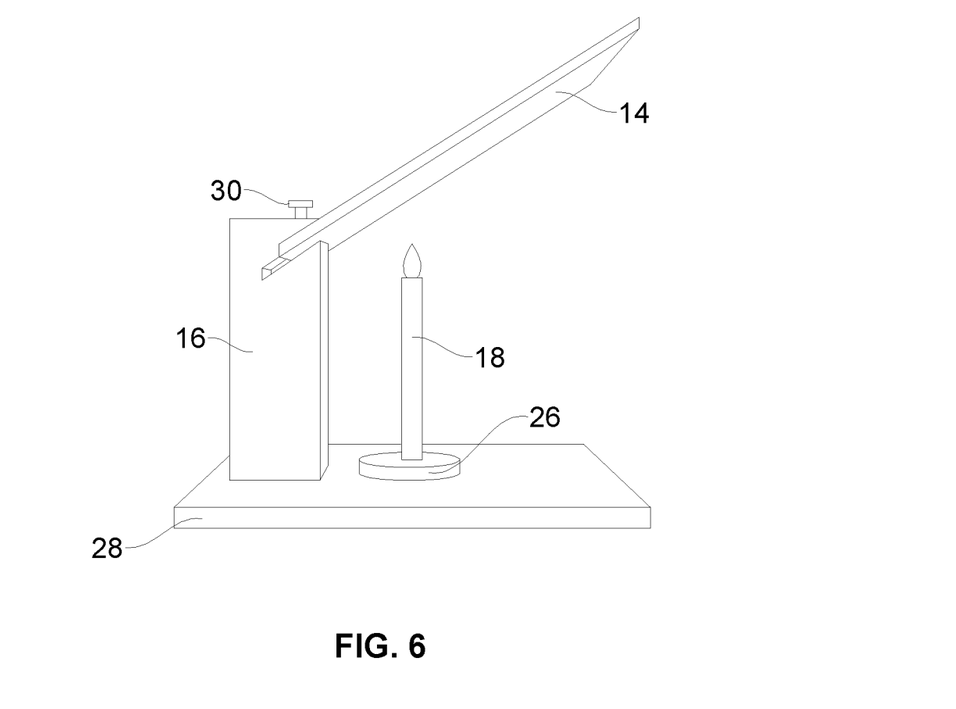
FIG. 6, according to an alternate embodiment of the present invention, depicts an illustration of a side view of the burner and specimen setup.

Referring to FIGS. 5 and 6, in an alternate embodiment, the specimen holder 16 is vertically disposed and is adapted to hold the specimen 14 obliquely at angle of 45° while the burner holder 26 (held on a platform 28) is adapted to hold the burner 18 uprightly. In the alternate embodiment, as can be appreciated from the referred drawings, the specimen 14 is held about its bottom edge by the specimen holder 16 as assisted by a screw 30. The specimen holder 16 allows for lateral movement of the specimen 14 in order to adjust the point of incidence of the flame thereupon. In this embodiment, the flame-exposure time the specimen 14 is exposed to is not limited to just 120 seconds. Notably, the specimen 14 is exposed to the flame until back-holing occurs thereon, wherein the concept of back-holing will become apparent from the following body of text.

The alternate embodiment too employs several electronic measurement devices and image analyzers, which, again, for ease of understanding, are divided into several functional modules. More particularly, the apparatus of the alternate embodiment in addition to all modules that are a part of the apparatus of the preferred embodiment (with the exception to fire-endurance module), includes a back-darkening, back-holing and back-firing modules wherein, the utility of each of these 'additional' modules will become apparent from the following body of text. Each 'additional' module is also designated to perform a function, the result of which is reflective of a combustive behavior of the specimen 14.

The back-darkening module is employed for recording the amount of time (referred to as back-darkening time) required for the back surface of specimen (opposite to the point of incidence) to darken. The back-holing module is adapted to record the amount of time (referred to as back-holing time) required for the back surface of specimen (opposite to the point of incidence) to fracture or split. The back-firing module is employed for recording the amount of time (referred to as back-firing time) required for the back surface of specimen (opposite to the point of incidence) to catch fire. As to the fact that combustion, in most materials, is related to the moisture content of the material (especially in hygroscopic materials such as wood and paper), it is recommended to condition the specimens in a conditioning chamber before carrying out the tests. Also, it is recommended to monitor the relative humidity of the gas used as well as the surrounding atmosphere. This way, all specimens in different runs and different times would have the same moisture content.

Combined embodiments of the apparatus that is used to determine the combustive behavior of a specimen may comprise: a housing; a burner holder disposed within the housing, the burner holder for holding a burner wherefrom flame is generated; a specimen holder disposed within the housing, the specimen holder for holding a specimen, the distance between the specimen holder and the burner holder being adjustable, the specimen configured to be exposed to the flame for a predetermined flame-exposure time; an ignition module for recording the amount of time taken for the onset of ignition visibly evident on the specimen at the point of incidence of the flame upon the specimen; a glowing module for recording the amount of time taken for the onset of glowing at the point of incidence; and a back-darkening module for recording the amount of time taken for the back of the specimen opposite to the point of incidence to darken.

The apparatus of the present invention may further comprise a back-holing module for recording the amount of time taken for back of the specimen to incur fracture or split owing to the flame exposure; a back-firing module for recording the amount of time taken for back of the specimen to catch visible fire; a fire-endurance module for recording the amount of time taken for the fire to hold upon disengagement between flame and the specimen; a width module for, upon the completion of the flame-exposure time, measuring the width of the combusted surface on the specimen; and a length module for, upon the completion of the flame-exposure time, measuring the length of the combusted surface on the specimen.

Further still, the apparatus may additionally comprise an area module for, upon the completion of the flame-exposure time, determining the area of the combusted surface on the specimen; a mass loss module for, upon the completion of the flame-exposure time, determining the mass loss, the specimen has incurred from the combustion; a heat module for determining the amount of heat released from the combustion of the specimen; and a smoke module for determining the amount of smoke released from the combustion of the specimen.

The length and the width (or diameter) of the flame emanating from the burner may be adjustable. The flow-rate of the fuel fueling the flame, as well as the calorie of the fuel, may also be adjustable. The flow rate of oxygen supplied into the housing may also be adjustable. The apparatus may further comprise a width module for, upon the completion of the flame-exposure time, measuring the width of the combusted surface on the specimen; and a length module for, upon the completion of the flame-exposure time, measuring the length of the combusted surface on the specimen. The apparatus may further comprise an area module for, upon the completion of the flame-exposure time, determining the area of the combusted surface on the specimen. The apparatus may further comprise a mass loss module for, upon the completion of the flame-exposure time, determining the mass loss, the specimen has incurred from the combustion.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions.

Although specific terms may be employed herein, they are used only in generic and descriptive sense and not for purposes of limitation. Accordingly, the present invention is not limited to the specific embodiments illustrated herein. While the above is a complete description of the preferred embodiments of the invention, various alternatives, modifications, and equivalents may be used. Therefore, the above description and the examples should not be taken as limiting the scope of the invention, which is defined by the appended claims.

What is claimed is:

1. An apparatus for determining the combustive behavior of a specimen, the apparatus comprising:
   (a) a housing;
   (b) a burner holder disposed within the housing, wherein the burner holder is for holding a burner wherefrom a flame is generated;
   (c) a specimen holder disposed within the housing, wherein the specimen holder is for holding a specimen, the distance between the specimen holder and the burner holder is adjustable, and the specimen is configured to be exposed to the flame for a predetermined flame-exposure time;
   (d) an ignition module for recording the amount of time taken for the onset of ignition that is visibly evident on the specimen at a point of incidence of the flame upon the specimen; and
   (e) a module for recording the amount of time taken for the onset of glowing of the specimen at the point of incidence.

2. The apparatus of claim 1, wherein any module comprises an image analyzer.

3. The apparatus of claim 1, wherein the burner comprises a Bunsen-type burner.

4. The apparatus of claim 1, wherein the specimen comprises one of a species of solid wood, wood-composite material, paper, cardboard, fiberboard, particleboard and a wood-plastic composite.

5. The apparatus of claim 1, wherein the specimen is treated or impregnated with at least one or more preservatives, one or more fire retardants, and one or more nanomaterials.

6. The apparatus of claim 1, wherein the length and the width (or diameter) of the flame emanating from the burner is adjustable.

7. The apparatus of claim 1, wherein the flow-rate of a fuel fueling the flame is adjustable.

8. The apparatus of claim 1, wherein a flow rate of oxygen supplied into the housing is adjustable.

9. The apparatus of claim 1, further comprising:
   (a) a width module for, upon the completion of the flame-exposure time, measuring the width of a combusted surface on the specimen;
   (b) a length module for, upon the completion of the flame-exposure time, measuring the length of a combusted surface on the specimen; and
   (c) an area module for, upon the completion of the flame-exposure time, determining the area of a combusted surface on the specimen.

10. The apparatus of claim 1, further comprising a mass loss module for, upon the completion of the flame-exposure time, determining the mass loss that the specimen has incurred from a combustion.

11. The apparatus of claim 1 further comprising:
   (a) a heat module for determining the amount of heat released from a combustion of the specimen; and
   (b) a smoke module for determining the amount of smoke released from a combustion of the specimen.

12. The apparatus of claim 1, wherein the housing comprises:
   (a) a base;
   (b) a pair of opposingly-disposed parallel sidewalls extending upwardly from the base;
   (c) a rear wall extending upwardly from the base, the rear wall being perpendicular to the sidewalls, and the height of the rear wall being same as that of a sidewall;
   (d) a front wall extending upwardly from the base and being parallel to the rear wall, the height of the front wall being lesser than that of the rear wall; and
   (e) an open top;

wherein the rear and sidewalls are for preventing the intervention of air with the flame while the shorter height of the front wall and the open top enable user-access into the housing.

13. The apparatus of claim 1, wherein the calorie of a fuel is adjustable.

14. The apparatus of claim 13, wherein any module comprises an image analyzer.

15. The apparatus of claim 1, wherein the specimen comprises a flat rectangular sheet.

16. The apparatus of claim 15, wherein the flat rectangular sheet is held obliquely by the specimen holder and an angle of the incidence of the flame upon the specimen is oblique; wherein the flame is disposed underneath the oblique rectangular sheet.

17. The apparatus of claim 16, further comprising:
    (a) a back-darkening module for recording the amount of time taken for the back of the specimen opposite to the point of incidence to darken;
    (b) a back-holing module for recording the amount of time taken for the said back of the specimen to incur a fracture or split owing to the flame exposure; and
    (c) a back-firing module for recording the amount of time taken for the said back of the specimen to catch visible fire.

18. The apparatus of claim 15, wherein the flat rectangular sheet is held upright by the specimen holder, and the flame from the burner is obliquely incident upon the specimen.

19. The apparatus of claim 1, further comprising a fire-endurance module for recording the amount of time taken for a fire to hold upon disengagement between the flame and the specimen.

20. An apparatus for determining the combustive behavior of a specimen, the apparatus comprising:
    (a) a housing;
    (b) a burner holder disposed within the housing, wherein the burner holder is for holding a burner wherefrom a flame is generated;
    (c) a specimen holder disposed within the housing, wherein the specimen holder is for holding a specimen, the distance between the specimen holder and the burner holder is adjustable, and the specimen is configured to be exposed to the flame for a predetermined flame-exposure time;
    (d) an ignition module for recording the amount of time taken for the onset of ignition that is visibly evident on the specimen at a point of incidence of the flame upon the specimen;
    (e) a module for recording the amount of time taken for the onset of glowing of the specimen at the point of incidence;
    (f) a fire-endurance module for recording the amount of time taken for a fire to hold upon disengagement between the flame and the specimen;
    (g) a width module for, upon the completion of the flame-exposure time, measuring the width of a combusted surface on the specimen;
    (h) a length module for, upon the completion of the flame-exposure time, measuring the length of a combusted surface on the specimen;
    (i) an area module for, upon the completion of the flame-exposure time, determining the area of a combusted surface on the specimen;
    (j) a mass loss module for, upon the completion of the flame-exposure time, determining the mass loss, that the specimen has incurred from a combustion;
    (k) a heat module for determining the amount of heat released from a combustion of the specimen, and
    (l) a smoke module for determining the amount of smoke released from a combustion of the specimen.

* * * * *